United States Patent
Aubert et al.

(10) Patent No.: US 9,243,734 B2
(45) Date of Patent: Jan. 26, 2016

(54) CONNECTOR SYSTEM FOR EXHAUST EXTRACTION SYSTEM

(75) Inventors: Geoffrey Johannes Sylvain Aubert, Alkmaar (NL); Vincent Nicolaas Johannes Van Baar, Heiloo (NL); Shawn Thomas Smith, Freehold, NJ (US)

(73) Assignee: PLYMOVENT CORPORATION, Cranbury, NJ (US)

( * ) Notice: Subject to any disclaimer, the term of this patent is extended or adjusted under 35 U.S.C. 154(b) by 0 days.

(21) Appl. No.: 13/502,089

(22) PCT Filed: Oct. 14, 2010

(86) PCT No.: PCT/EP2010/065479
§ 371 (c)(1),
(2), (4) Date: Apr. 13, 2012

(87) PCT Pub. No.: WO2011/045399
PCT Pub. Date: Apr. 21, 2011

(65) Prior Publication Data
US 2012/0198826 A1    Aug. 9, 2012

(51) Int. Cl.
*F16L 37/00* (2006.01)
*B08B 15/00* (2006.01)
*F01N 13/18* (2010.01)
*F16L 23/00* (2006.01)

(52) U.S. Cl.
CPC .............. *F16L 37/004* (2013.01); *B08B 15/002* (2013.01); *B08B 15/005* (2013.01); *F01N 13/1805* (2013.01); *F16L 23/00* (2013.01)

(58) Field of Classification Search
CPC .................................... F16L 37/004

USPC ......................................... 285/9.1
See application file for complete search history.

(56) References Cited

U.S. PATENT DOCUMENTS 2,793,057 A    5/1957    McGugin
2,953,970 A *  9/1960    Maynard ................... 359/611
(Continued)

FOREIGN PATENT DOCUMENTS

DE    4214908 C1    9/1993
EP    0459249 A2   12/1991
(Continued)

OTHER PUBLICATIONS

"Nederman MagnaSystem. Exhaust Extraction Solutions for Emergency Vehicles", AB Ph. Nederman & Co., Sydhamnsgatan 2, SE-252 28 Helsingborg, Sweden, No. 9880001, May 5, 2005, pp. 1-8.

(Continued)

*Primary Examiner* — James Hewitt
(74) *Attorney, Agent, or Firm* — Morrison & Foerster LLP

(57) ABSTRACT

A connector system for connecting an exhaust extraction system to the exhaust pipe of an internal combustion engine. The connector system comprises a first flange, which can be connected to the exhaust pipe of the engine. A second flange is connected to a conduit through which exhaust fumes are evacuated. The first and second flanges can have mating tapered surfaces, to facilitate alignment of the second flange relative to the first flange. The second flange preferably comprises magnets for providing a secure connection between the first flange and the second flange, while enabling quick release of the connection. The magnets are preferably arranged in an asymmetric configuration.

10 Claims, 4 Drawing Sheets

(56) References Cited

U.S. PATENT DOCUMENTS

| | | | |
|---|---|---|---|
| 3,181,895 A | 5/1965 | Cator | |
| 4,012,058 A | 3/1977 | Patton | |
| 4,465,308 A | 8/1984 | Martini | |
| 4,693,421 A | 9/1987 | Cameron, Sr. | |
| 5,092,228 A | 3/1992 | Pfeiffer, Jr. et al. | |
| 5,096,230 A | 3/1992 | Pausch et al. | |
| 5,162,017 A | 11/1992 | Nordin | |
| 5,330,234 A | 7/1994 | Sweeny | |
| 5,453,048 A | 9/1995 | Zima et al. | |
| 5,466,900 A | 11/1995 | Knapp | |
| 5,518,447 A | 5/1996 | Nordin | |
| 5,542,250 A | 8/1996 | Ball et al. | |
| 5,609,298 A | 3/1997 | Hyslop | |
| 5,679,072 A | 10/1997 | Brodin et al. | |
| 5,911,623 A | 6/1999 | Trana et al. | |
| 5,927,759 A | 7/1999 | Hyslop | |
| 6,012,978 A | 1/2000 | Svensson et al. | |
| 6,306,031 B1 | 10/2001 | Hansen et al. | |
| 6,361,427 B1 | 3/2002 | Sjoberg | |
| 7,104,881 B1 | 9/2006 | Hyslop | |
| 7,216,897 B1 | 5/2007 | Hughes | |
| 2005/0189031 A1 | 9/2005 | Frink | |
| 2008/0084065 A1 | 4/2008 | Ogimura | |
| 2009/0250922 A1 | 10/2009 | Rossman et al. | |
| 2010/0072748 A1 | 3/2010 | Van Pelt | |
| 2011/0084474 A1 | 4/2011 | Paden et al. | |

FOREIGN PATENT DOCUMENTS

| | | | |
|---|---|---|---|
| EP | 0888830 A2 | | 1/1999 |
| GB | 983278 | * | 2/1965 |
| WO | 03/092920 A1 | | 11/2003 |

OTHER PUBLICATIONS

International Search Report and Written Opinion received for PCT Patent Application No. PCT/EP2010/065479, mailed on Mar. 21, 2012, 9 pages.

NoSmokeKing. "Vehicle exhaust extraction system," located at <www.nosmokeking.com> visited on Oct. 29, 2009. (4 pages).

* cited by examiner

CONNECTOR SYSTEM FOR EXHAUST EXTRACTION SYSTEM

CROSS REFERENCE TO RELATED APPLICATIONS

This is a U.S. National Phase patent application of PCT/EP2010/065479, filed Oct. 14, 2010, which claims priority to U.S. patent application Ser. No. 12/580,695, filed Oct. 16, 2009, all of which are hereby incorporated by reference in the present disclosure in their entirety.

BACKGROUND OF THE INVENTION

1. Field of the Invention

The invention relates generally to a connector system for an exhaust extraction system, and more particularly to a connector system for attaching a conduit to the exhaust pipe of an internal combustion engine.

2. Description of the Related Art

Numerous situations exist in which an internal combustion engine needs to be operated inside a structure, such as a garage. For example, car engines may need to be tuned and tested inside a repair shop. Emergency vehicles, such as ambulances and fire engines, are generally stored inside an emergency medical services (EMS) station or a fire station. Exhaust fumes enter the EMS station or fire station as the vehicle enters or leaves the station. In addition, there may be a need to run the engine inside the station for extended periods of time, for example when running a pump test on a fire engine.

Internal combustion engine exhaust fumes, in particular diesel fumes, have been identified as serious health hazards. There is a need for systems that remove air pollutants from the air inside buildings. The preferred method comprises capturing the fumes at the exhaust pipe of the internal combustion engine, and guiding the fumes to the outside of the building. To this end systems have been developed comprising a flexible hose provided with a nozzle for connecting the hose to the tailpipe of a vehicle. The hose is connected to a vent opening, for example in the roof of the building. In most cases the system comprises a fan for extracting exhaust fumes.

The operation of such systems generally involves the following steps. As the vehicle returns to the station, it is stopped just outside the station so that the tailpipe of the vehicle is within reach of the hose nozzle. A crew member attaches the nozzle to the tail pipe, upon which the vehicle enters the station. Many exhaust systems are provided with sensors to ensure automatic operation when the hose is connected to the tailpipe of a running engine. Typically the exhaust hose is kept connected to the tailpipe of the vehicle while the vehicle is in the station.

Upon leaving the station the nozzle needs to be disconnected from the tailpipe. Disconnection desirable occurs at a predetermined location, for example at the door opening of the station.

The nozzle connecting the hose to the tailpipe desirably meets a number of requirements. Alignment of the nozzle with the tailpipe should be quick and easy. The nozzle should make a robust and secure connection to the tailpipe. Release of the nozzle desirably occurs automatically as the vehicle leaves the station and the end of the tailpipe passes a predetermined point.

U.S. Pat. No. 5,927,759 to Hyslop discloses a connection assembly for an exhaust connection system. The assembly comprises three primary components. The first component is an annular sleeve designed to be attached to the tailpipe of a vehicle. The second component is a nozzle locator ring, which slides onto the annular sleeve. The third component is an exhaust nozzle assembly designed to slide onto, and fit up against, the nozzle locator ring. The exhaust nozzle assembly contains two magnet packs, which contact the outer surface of the annular sleeve when the exhaust nozzle assembly is connected.

The connection assembly disclosed in this reference is relatively complex. The need to slide the nozzle assembly over the ring makes alignment awkward and difficult. The assembly does not reliably disconnect automatically if the exhaust pipe of the vehicle is not parallel to the longitudinal axis of the vehicle.

U.S. Pat. No. 5,096,230 to Pausch et al. discloses a quick-release adapter for connecting the inlet of an exhaust removal hose to the outlet of the tailpipe of a vehicle. The adapter includes three disk-like permanent magnets, and three receptacle-shaped magnetic connectors secured to the outlet of the tailpipe. Alignment of the adapter to the outlet of the tailpipe is difficult and cumbersome, as it requires the simultaneous alignment of all three magnets with their respective connectors.

Thus, there is a particular need for a connector system facilitating the alignment of the nozzle with the outlet of the vehicle tailpipe. There is a further need for a system that reliably and automatically disconnects as the vehicle leaves the station, while providing a secure seal when the engine is in use.

BRIEF SUMMARY OF THE INVENTION

The present invention addresses these problems by providing a connector system for an exhaust extraction system, said connector system comprising a first flange defining a first opening, and a second flange defining a second opening, said first flange presenting a first tapered surface.

In an alternate embodiment the present invention provides a connector wherein the first tapered surface extends outward and away from the connection piece, so as to form a male connection flange.

Another aspect of the invention relates to an exhaust extraction system comprising the connector system of the invention.

BRIEF DESCRIPTION OF THE DRAWINGS

The features and advantages of the invention will be appreciated upon reference to the following drawings, in which.

DETAILED DESCRIPTION OF THE INVENTION

Figure 1:
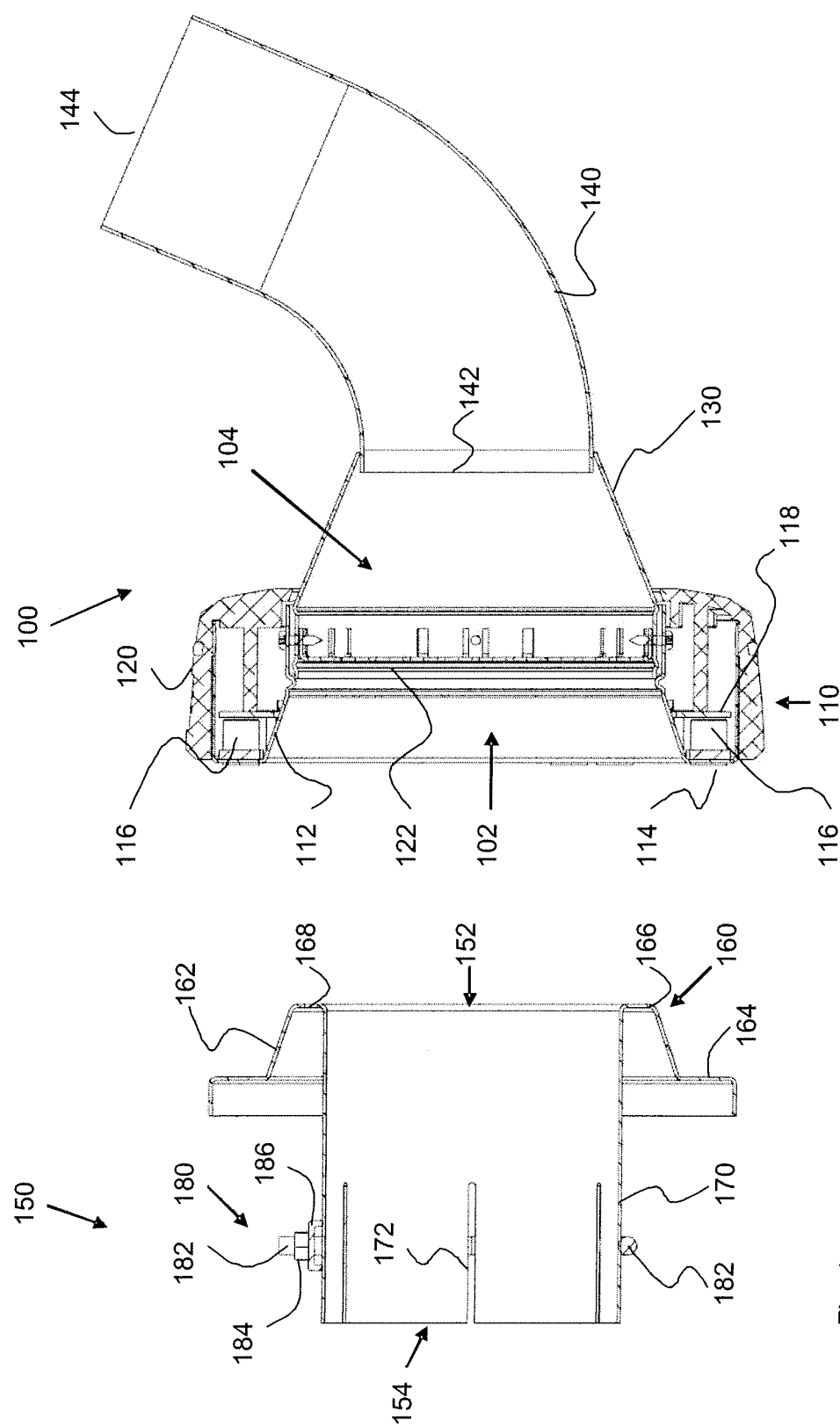
FIG. 1 is a longitudinal cross-section of one embodiment of the invention.

The present invention provides a connector system for an exhaust extraction system comprising a first flange, and a second flange which is sized and configured to mate with the first flange.

The first flange is designed to be connected to a vehicle equipped with an internal combustion engine. The first flange defines a first opening, which generally corresponds to the shape and size of the outlet of the exhaust pipe of the vehicle. The first flange is designed to be attached to the vehicle, either directly to the exhaust pipe of the vehicle, or to some other part of the vehicle in the vicinity of the exhaust pipe. Attachment directly to the outlet opening of the exhaust pipe is preferred.

The connection system of the invention comprises at least one of the following two features. Preferably the connection comprises both features.

The first feature comprises a first tapered surface presented by the first flange. The tapered surface facilitates alignment of the first and second flanges.

The second feature comprises a plurality of magnets which are placed asymmetrically on a surface of one of the flanges. Preferably the magnets are placed on the second flange. The asymmetric placement of the magnets permits tailoring the strength of the magnetic field along the surface of the flange, so that the strength of the magnetic field can be stronger in certain areas, and weaker in other areas. Tailoring of the strength of the magnetic field also makes it possible to minimize the number of magnets required for providing a reliable connection, which can result in substantial cost savings.

The first feature will now be illustrated with reference to a connection system having the first flange attached directly to the outlet of the tailpipe of a vehicle. It will be understood that this feature offers similar advantages in embodiments having the first flange attached to some other part of the vehicle.

In one embodiment the tapered surface extends away from the tailpipe, and tapers inwardly in the direction of the flow of the exhaust fumes. In this embodiment the smallest diameter of the tapered surface defines the first opening. In this embodiment the diameter of the second opening is identical to, or slightly larger than, the base of the tapered surface. Alignment of the two flanges is readily accomplished by sliding the second flange over the protruding tapered surface of the first flange.

In a still more preferred embodiment the second flange presents a second tapered surface, which is sized and configured to mate with the first tapered surface. In this embodiment the second opening is defined by the second tapered surface.

The first tapered surface can extend away from the tailpipe, and taper inwardly in the direction of the flow of the exhaust fumes, so as to form a male connection flange piece. The mating second tapered surface forms a female connection flange piece.

In an alternate embodiment the first tapered surface extends inward and toward the outlet of the tailpipe, so as to form a female connection flange piece. The mating second tapered surface forms a male connection flange piece.

Desirably, the first flange further presents a first substantially flat surface substantially parallel to the plane of the first opening. This substantially flat surface preferably extends annually around the base of the first tapered surface.

The second flange can present a second substantially flat surface substantially parallel to the plane of the second opening. This second substantially flat surface preferably extends annually around the base of the second tapered surface. The second substantially flat surface can be made to mate with the first substantially flat surface.

The first or the second flange can be provided with one or more magnets, so as to provide a magnetic force for holding together the two flanges. Preferably the magnets are provided in the second flange, so as to reduce exposure of the magnets to high exhaust gas temperatures, and dirt and dust. The magnets can be electromagnets or permanent magnets. If permanent magnets are used, rare earth magnets are preferred.

The mating flange provides a magnetic or magnetizable surface for attaching the magnets to when the two flanges are connected. The magnetizable surface preferably comprises a ferromagnetic material.

The magnets can be placed in one of the substantially flat surfaces or in one of the tapered surfaces. A preferred location for the magnets is so as to project a magnetic field from the second substantially flat surface. Preferably the magnetic field is projected in a direction substantially perpendicular to the second substantially flat surface. For example, rod or disk magnets can be placed immediately behind the second substantially flat surface, or can be placed in holes so as to protrude through the second substantially flat surface. The latter configuration is preferred, as it permits direct contact of the magnets with the mating surface.

It is advantageous to mount the magnets pivotably. This arrangement enables contact of the magnet with the opposite mating surface, even when the two mating surfaces are not perfectly aligned, due to the presence of debris particles between the two surfaces, for example.

In a preferred embodiment the connector system comprises more than one magnet, and the plurality of magnets are distributed asymmetrically over the mounting surface, for example the second substantially flat surface. This asymmetric distribution of the magnets permits the magnetic force to be tailored according to the location in the flange. For example, more than half of the magnets may be placed in the lower half of the connection system. As a result, a greater force is needed to disconnect the two flanges by bulling in an upward direction than the force that is needed for disconnection by pushing downward on the second flange. Thus, it will require less force to manually disconnect the second flange from the vehicle than to pull it off with a ceiling-mounted hose.

Similarly, an asymmetric distribution of magnets can be used to ensure reliable release of the connection system when mounted on a tail pipe that is not parallel to the longitudinal axis of the vehicle. This can be done by placing fewer than half of the magnets in the forward facing half of the second flange.

The second flange can have a tubular piece for attachment of an exhaust conduit, such as a flexible hose. The tubular piece is preferably elbow-shaped. The angle of the elbow can be selected to be approximately identical to the angle of the conduit relative to the vehicle when the vehicle reaches the point of release of the connection system, so as to ensure a more or less uniform distribution of the pulling force in the lower portion of the conduit.

Depending on the attachment point of the lower portion of the conduit at or near the ceiling of the building, the angle of the elbow can be in the range of from about 0° to about 90°, preferably from about 15° to about 75°.

The asymmetric placement of the magnets can be selected in function of the position of the elbow. It is generally advantageous to place more than half of the magnets in the half of the flange nearer the outside angle of the elbow.

It will be understood that the various advantages of the second feature, i.e., the asymmetric placement of the magnets, can be obtained in embodiments that do not have the first feature, i.e., the tapered surface or surfaces. Embodiments incorporating the second feature without also incorporating the first feature are specifically contemplated.

Another aspect of the present invention is a system for extracting exhaust fumes incorporating the inventive connection system. The system generally comprises a conduit having a first and a second end, the first end being connected to the second flange.

The second end of the conduit is connected to a vent which is in communication with the outside of the building. The system can comprise a fan for transporting exhaust fumes through the conduit.

The first flange can be mounted directly to the outlet of the exhaust pipe of an internal combustion engine, for example the engine of a vehicle. In the alternative, the first flange is mounted to a part of the vehicle in the vicinity of the outlet of the exhaust pipe of the vehicle, such that the first opening overlays the outlet opening of the exhaust pipe. In the former case the first flange can be provided with a connecting pipe for attaching the flange to the exhaust pipe.

It will be understood that the first flange and the second flange can be interchanged, such that the second flange is mounted on the vehicle, and the first flange is connected to the conduit.

The conduit is connected to the vehicle by mating the second flange to the first flange. Due to the mating surfaces, the connection provides a secure seal. The system can be provided with a pressure sensor inside the conduit. If the engine is running with the conduit attached to its exhaust pipe, the resulting pressure build-up in the conduit is detected by the pressure sensor. The sensor can be used to automatically switch on the exhaust fan when pressure build-up occurs. The same sensor can be used to switch off the fan when the pressure drops, for example after the engine is switched off, or after the conduit becomes disconnected from the exhaust pipe.

It can be desirable to provide air vents in at least one of the flanges, so that ambient air is pulled into the system when the fan is in use. The ambient air cools down the exhaust fumes before they enter the conduit, thereby reducing the risk of heat damage to the conduit and other parts of the exhaust extraction system. The air vents are preferably provided in the flange that is mounted on the vehicle. Preferably the air vents are provided with air valves, to prevent exhaust fumes from entering the building structure, for example during brief periods of over-pressure as may occur when the engine is running and the fan has not yet been switched on by the pressure sensor.

The system is designed for the second flange to disconnect from the first flange when a pulling force is applied to the second flange. In a rudimentary embodiment, the conduit is flexible and has a certain length. When the vehicle leaves the station, the conduit will follow the vehicle until the conduit is fully extended. When the conduit cannot extend further, the second flange will become disconnected from the first flange. The tensile strength of the conduit is chosen to well exceed the magnetic force holding together the first and second flanges.

It is desirable to guide the movements of the conduit while the vehicle pulls out of the station. For example, the conduit may be suspended from a trolley which travels on a track below the ceiling of the building. When the vehicle is at rest, the trolley is approximately straight above the outlet of the exhaust pipe. When the vehicle moves out of the station, the trolley moves along its track in the general direction of the exit door of the station, until it reaches the end of the track.

It is desirable to provide a spring balancer, which can be connected to the conduit at a point near the second flange, or at a point between the second flange and the ceiling of the building. The spring balancer comprises a spring loaded cable, which unwinds as the vehicle pulls out on the building. The spring balancer further comprises a limiter, which limits the unwinding of the spring loaded cable.

DESCRIPTION OF ILLUSTRATIVE EMBODIMENTS

The following is a description of certain embodiments of the invention, given by way of example only and with reference to the drawings. Referring to FIG. 1, a longitudinal cross section view is shown of a specific embodiment of the connector system of the invention.

The connection system of FIG. 1 comprises a first flange 150, and a second flange 100.

Second flange 100 defines a second opening 102 which tapers down to a smaller diameter at 104. Mesh screen 122 is provided in opening 102. The purpose of mesh screen 122 is to capture particulate debris that may be entrained by exhaust fumes.

Second opening 102 is surrounded by a support flange 110. The support flange 110 presents a second tapered surface 112. The direction of tapering is such that the diameter of opening 102 decreases going from left to right in FIG. 1.

The support flange 110 further presents a second substantially flat surface 114. The second substantially flat surface 114 is parallel to the plane of second opening 102 and has magnets 116 accommodated in the outer surface of the second substantially flat surface 114. The magnets 116 are not rigidly fixed to the second flange portion 114, but are fit loosely in the second flange portion 114.

An inner flange portion 118 is provided to keep the magnets 116 at their proper location. The inner flange portion 118 is positioned such that the magnets are allowed to move to a certain extent, in particular to slightly pivot. Preferably, the magnets 116 are provided in pairs in which pairs of magnets are affixed to a plate so that the magnets of one pair can pivot in tandem.

In the embodiment depicted, the first flange portion 112 is surrounded by the second flange portion 114.

The outer perimeter of the support flange 110 is clad with a rubber mantle 120 to protect second flange 100, as well as a vehicle to which the extraction adapter 100 may be connected, from damage during connection and disconnection of the two flanges.

The second flange 100 further comprises a conical connecter 130 connected at its larger end to the second opening 102 at location 104. At its smaller end the conical connecter 130 is connected to pipe element 140. A first opening 142 of pipe element 140 is provided at an angle of about 60° from a second opening 144 of pipe element 140. Other angles may be considered to embody the invention as well, ranging from 0° to 90°.

The first flange 150 defines a first opening 152. The first opening 152 of the exhaust pipe adapter 150 is surrounded by flange portion 160. First flange 150 is provided with a connection portion 170. In this embodiment opening 154 of connection portion 170 has substantially the same diameter as first opening 152.

The connection portion 170 comprises slits 172. The connection portion 170 is arranged to be slid over an exhaust pipe of a vehicle. The slits 172 are provided to make the diameter of opening 154 slightly adjustable, to facilitate connection of the exhaust pipe adapter 150 to the exhaust pipe of a vehicle (not shown). Upon application of the exhaust pipe adapter 150 to the exhaust pipe of the vehicle, the exhaust pipe adapter 150 can be affixed to the exhaust pipe by means of a pipe clamp 180. Pipe clamp 180 comprises a threaded rod 182 that is bent around the connection portion 170 at an angle of 180°. Both ends of the threaded rod 182 are guided through holes in a fixating element 186 and secured by means of bolts 184. By tightening bolts 184 to the threaded rod 182, the connection portion 170 is firmly attached to the exhaust pipe. Naturally, other fixating elements known in the art may be applied instead of pipe clamp 180.

Flange portion 160 presents a first tapered surface 162. First tapered surface 162 tapers such that the outer diameter of flange portion 160 tapers down going from left to right in FIG. 1. Flange portion 160 further presents a first substantially flat surface 164. The first substantially flat surface 164 has an orientation parallel to first opening 152. Additionally, flange portion 160 comprises a third flat surface 166. The third flat surface 166 comprises air vents 168.

In the embodiment depicted, the third flat surface 166 is surrounded by the first tapered surface 162, which is in turn surrounded by the first flat surface 164.

The dimensions of tapered surfaces 162 and 112 and their angles of tapering are such that the second tapered surface 162 fits snugly inside first tapered surface 112.

Figure 2:
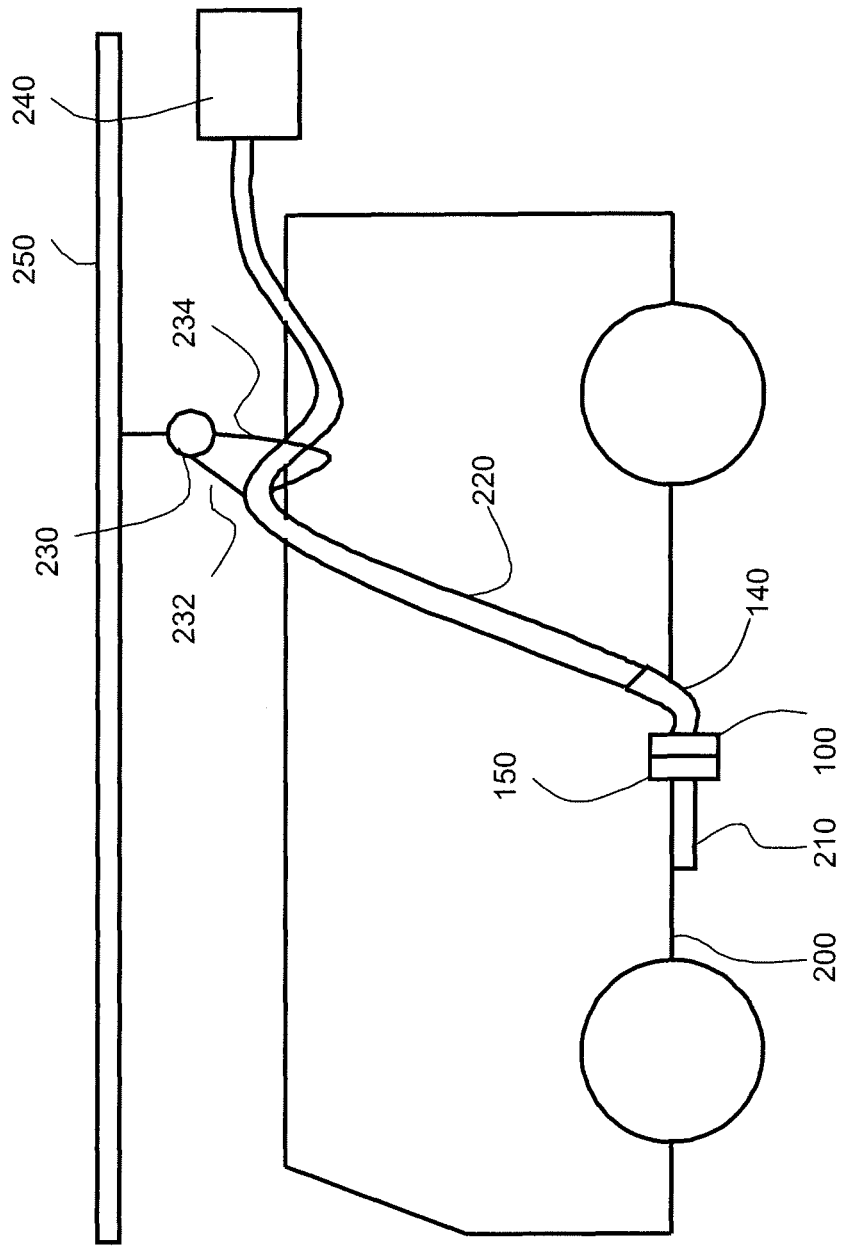
FIG. 2 is a schematic representation of an exhaust extraction system according to the invention.

FIG. 2 discloses a schematic view of an emergency vehicle 200 comprising an exhaust pipe 210. First flange 150 is connected to the exhaust pipe 210. Second flange 100 is connected to first flange 150 at the first opening by means of the force exerted by magnets. At pipe 140, the second flange is connected to one end of extraction hose 220. The other end of the extraction hose 220 is connected to a forced airflow generator 240, the hose 220 serving as a conduit for exhaust fumes from the vehicle 200. The forced airflow generator 240 creates a forced airflow, thereby extracting exhaust fumes from the exhaust pipe 210 of the emergency vehicle 200. The extraction hose is affixed to a building structure such as a fire station via a spring balancer 230. The spring balancer 230 is connected to the fire station structure via rail system 250.

When the emergency vehicle 200 exits the structure, the extraction hose 220 will follow the emergency vehicle as the hose is coupled to the vehicle 200 via the extraction adapter 100 connected to the exhaust pipe adapter 150, which is in turn connected to the exhaust pipe 210. With this action, first the spring balancer 230 will follow the emergency vehicle 200 via the rail system 250. At the end of the rail system 250, the horizontal movement of the spring balancer 230 is blocked.

Subsequently, a cable 232 is unwound from the spring balancer 230 at a pre-determined force. Before the cable 232 is fully unwound from the spring balancer 230 the cable 232 becomes blocked by limiter 234. This results in a sudden and significant increase in the force exerted by the spring balancer 230 on the extraction hose 220, via the cable 232. This force is transferred by the extraction hose 220 to second flange 100, resulting in the second flange's 100 breaking away from first flange 150.

Figure 3:
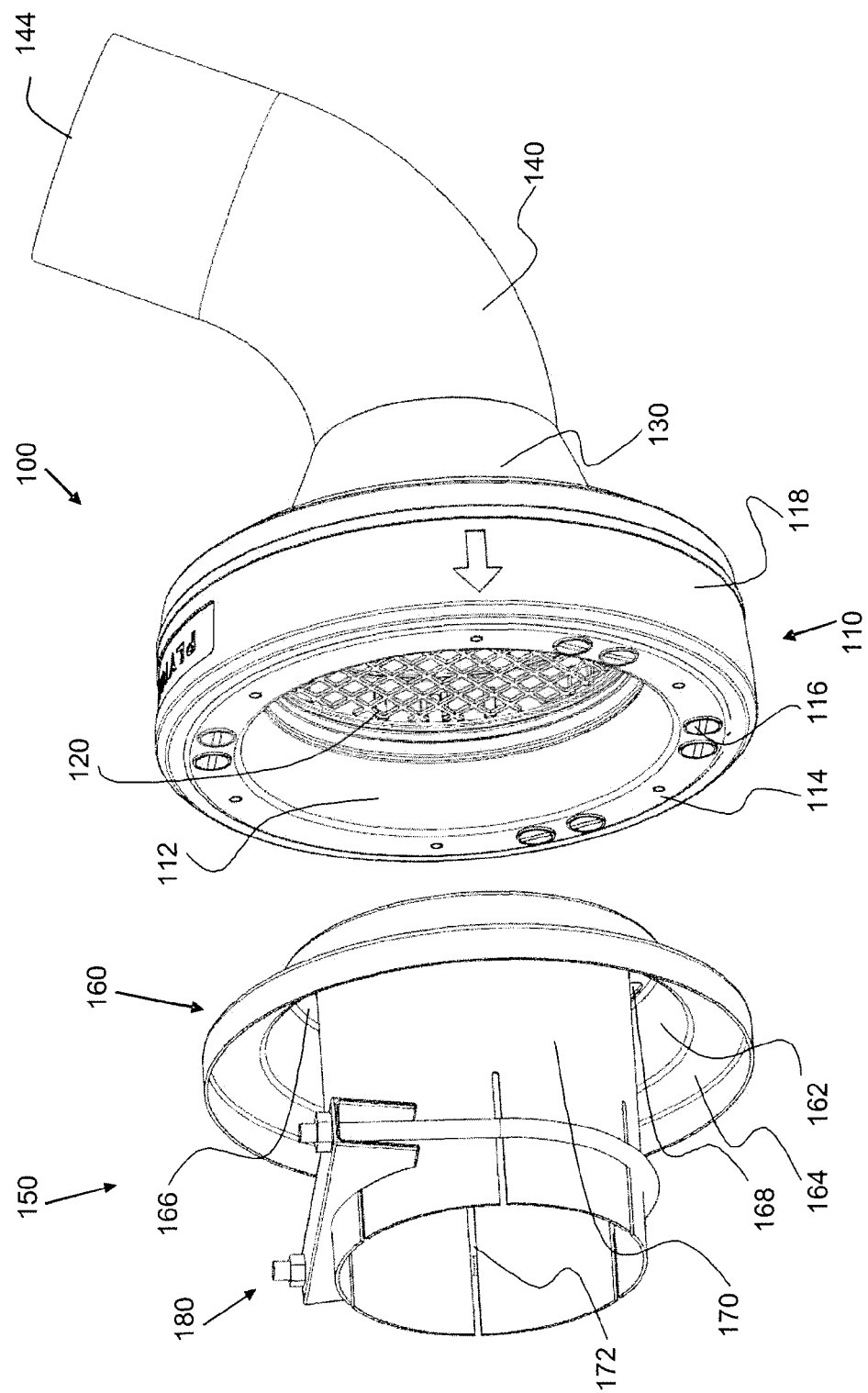
FIG. 3 is a perspective view of one embodiment of the connector system of the invention, showing the outside of the first flange and the inside of the second flange.

FIG. 3 shows a perspective view of second flange 100 and first flange 150. In particular, the location of the magnets 116 on the second substantially flat surface 114 can be seen in more detail than shown in FIG. 1. In the embodiment shown in FIG. 3 the magnets 116 are provided in pairs. In addition, magnets 116 are asymmetrically distributed over second flat surface 114 in that the bottom half of second flat surface 114 comprises more magnets 116 than does the top half of the second flat surface 114.

As a result of this placement, second flange 100 can be manually disconnected from first flange 150 with relative ease by pushing down on elbow 140, even though the magnetic force is amply sufficient to maintain a secure connection in use.

Figure 4:
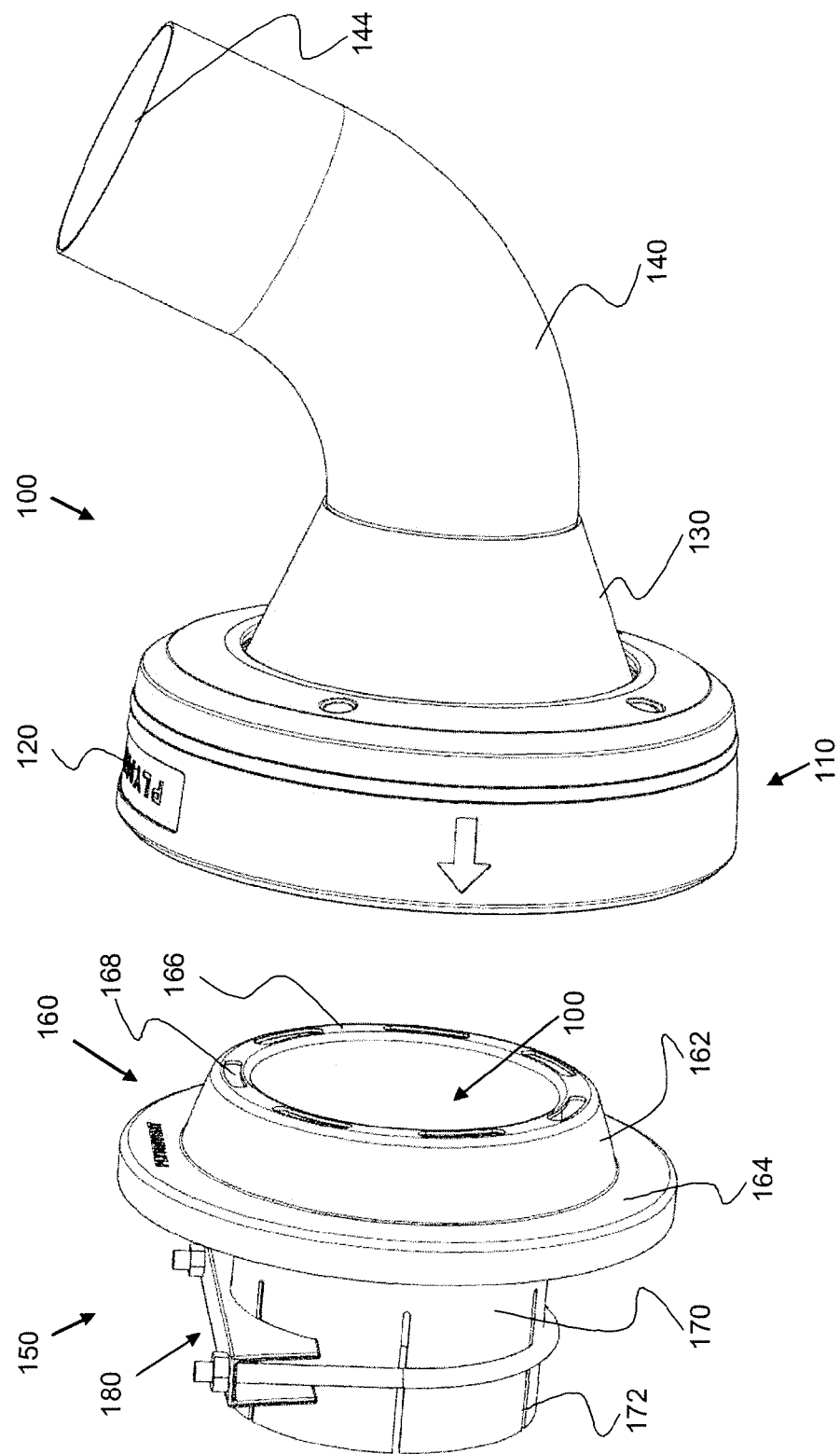
FIG. 4 is a perspective view of the embodiment of FIG. 3, showing the inside of the first flange and the outside of the second flange.

FIG. 4 shows the connector system in a different perspective. This perspective provides in particular a better view of air vents 168 provided in third flat surface 166. These openings 168 are provided to provide a flow of ambient air at ambient temperature to be mixed with exhaust fumes when the extraction adapter 100 is connected to the exhaust pipe 210 while extracting exhaust fumes. This results in a significant cooling of the exhaust fumes, which protects temperature sensitive parts of the exhaust system from heat damage.

It can be desirable to provide air vents 168 with air valves, such as rubber flaps, to prevent exhaust fumes from escaping into the structure if over-pressure develops during operation of the system.

Having discussed various embodiments of the various aspects according to the invention, a person skilled in the art will appreciate that further variations of those embodiments are possible without departing from the scope of the invention. For example, male tapered surface 162 and female tapered surface 112 can be interchanged between the first flange and the second flange.

Additionally or alternatively, the locations of the second tapered surface 112 and the second flat surface 114 may be interchanged on second flange 100. This results in a configuration in which second tapered surface 112 surrounds second flat surface 114. This option applies as well to the locations of the first tapered surface 162 and the first flat surface 164, which are interchangeable as well. A person skilled in the art will appreciate that this interchange has to be performed on both the second flange 100 and the first flange 150 simultaneously, so as to maintain their mating properties.

In a further embodiment, the magnets 116 are provided in the second tapered surface 112. In this way, the second flat surface 114 and the first flat surface 164 have lost most of their function, and could be omitted. In other words, the second tapered surface 112 and the second flat surface 114 can be integrated into one single flange portion. Likewise, first tapered surface 162 and first flat surface 164 can be integrated into one single adapter flange portion.

In yet another embodiment, the magnets 116 are not provided in the second flange 100, but in first flange 150. This embodiment is less preferred for internal combustion engines in vehicles, as the magnets would be exposed to adverse conditions during operation of the vehicle outside the station. This embodiment is more suitable for use with stationary internal combustion engines.

A person skilled in the art will readily appreciate that various parameters disclosed in the description may be modified and that various embodiments disclosed and/or claimed may be combined without departing from the scope of the invention.

What is claimed is:

1. A vehicle exhaust extraction system for a vehicle having an exhaust opening, the system having
   a first flange for defining the exhaust opening in a first plane and
   a conduit having at an end a second flange defining a second opening in a second plane,
   said first flange presenting
      a first contact surface substantially parallel to the first plane and
      a first male or female tapered surface extending transversely to the first contact surface of the first flange from a position near the exhaust opening,
   said second flange presenting
      a second contact surface substantially parallel to the second plane and a second female or male tapered surface that is complementary to the first tapered surface and extending transversely to the second contact surface of the second flange from a position near the second opening, the first and second contact surfaces being of annular shape and extending radially outwardly from the tapered surfaces, one or more magnets being placed on the first or second contact surfaces, wherein the magnets in a connected state keep the first and second contact surfaces and the male and female tapered surfaces in a disconnectable contacting relationship, wherein the second contact surface comprises a flat surface comprising a top half and a bottom half, and a distribution of magnetic force over the bottom half is higher than over the top half, and wherein the magnetic force in the bottom half is at least two times larger than the magnetic force in the top half, such that when an external force is acting on the first flange, second flange or the conduit, the magnets pivot to permit disconnection of the first and second flange.

2. The exhaust extraction system of claim 1 wherein the first and second tapered surfaces are sized and configured to mutually mate upon connecting the first and second flanges.

3. The exhaust extraction system of claim 1 wherein the magnetic field is projected substantially perpendicularly to the second substantially flat surface.

4. The exhaust extraction system of claim 1 wherein the second flange is provided with a tubular piece for connecting an exhaust hose, said tubular piece having an elbow shape.

5. The exhaust extraction system of claim 4 wherein the elbow shape has an angle of between 15° and 75°.

6. The exhaust extraction system of claim 1 wherein the first flange further comprises a connection piece for connecting the first flange to an exhaust pipe of an internal combustion engine.

7. The exhaust extraction system of claim 6 wherein the first tapered surface extends outward and away from the connection piece, so as to form a male connection flange piece.

8. The exhaust extraction system of claim 6 wherein the first tapered surface extends inward and toward the connection piece, so as to form a female connection flange piece.

9. The exhaust extraction system of claim 1, the first flange being sized and configured to be connected to an exhaust pipe of an internal combustion engine.

10. The exhaust extraction system of claim 9 wherein the internal combustion engine is located in a vehicle, and the second flange automatically disconnects from the first flange as the exhaust pipe reaches a predetermined location as a result of movement of the vehicle.

\* \* \* \* \*